May 14, 1929.  R. M. HILL  1,713,338
FOCUSING SHUTTER
Filed Feb. 8, 1927
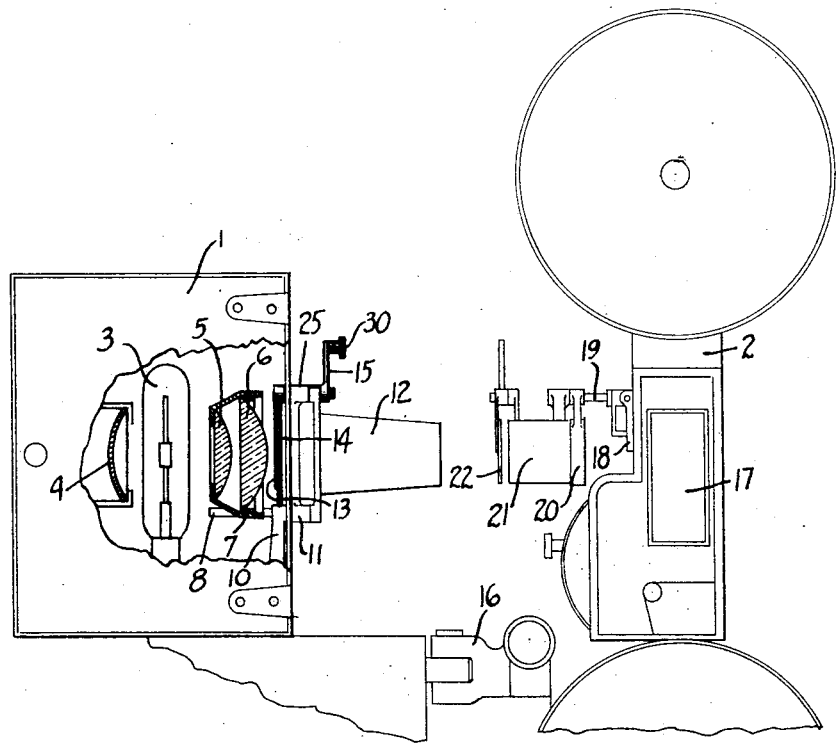
Fig. 1
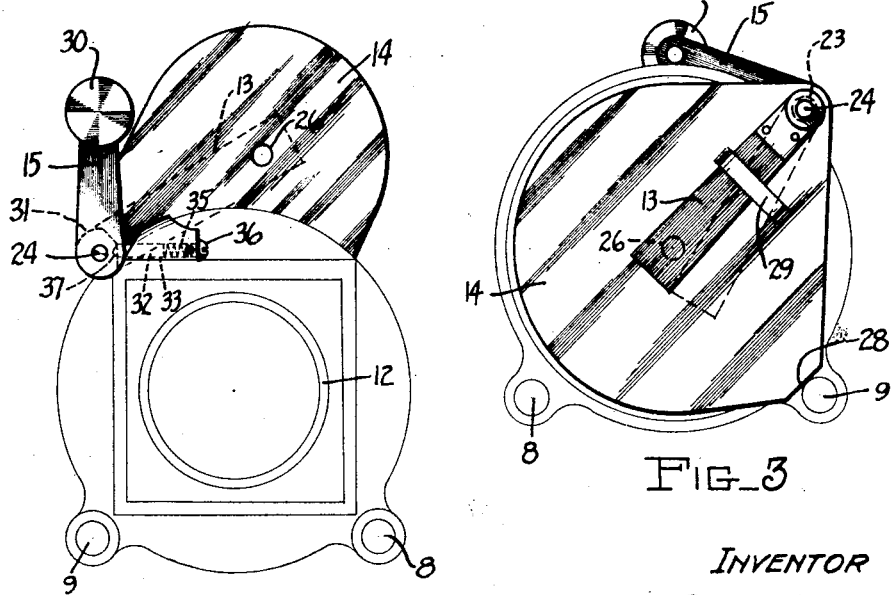
Fig. 2
Fig. 3
INVENTOR
ROGER M. HILL
BY Jos. P. McMullen
ATTY.

Patented May 14, 1929.

1,713,338

UNITED STATES PATENT OFFICE.

ROGER M. HILL, OF WASHINGTON, DISTRICT OF COLUMBIA.

FOCUSING SHUTTER.

Original application filed January 12, 1927, Serial No. 160,644. Divided and this application filed February 8, 1927. Serial No. 166,804.

This invention relates to stereopticons, spotlights and other forms of projection apparatus, more especially it is directed to a device for focusing.

One object of this invention is to provide a combined shutter and douser, so interrelated in their action as to initially completely occult the entire light beam and then permit the projection of a beam of restricted dimensions.

Another object of this invention is to provide a combined shutter and douser, the douser overlying the shutter to normally close a miniature light aperture, but operable after closure of the shutter to expose the miniature light aperture.

With these and other objects in view this invention consists in certain novel details of construction, combination and arrangement of parts to be more particularly hereinafter set forth and claimed.

This invention is a division of the subject matter set forth in the companion application executed January 12, 1927, Ser. No. 160,644 for an auxiliary focusing device and projection apparatus.

Briefly stated this invention consists of a means controllable by a single operation, for instantaneously blocking the light source at the lamp house from the remainder of the apparatus, and for reducing the projection beam to a dimension which permits of the focusing of a distinct image of the luminant at a predetermined point along the optical axis.

Referring more particularly to the accompanying drawings in which corresponding parts are indicated by similar reference characters:

Fig. 1 is a side elevation partly in section showing a lamp house and projector in operative position.

Fig. 2 is a front elevation of the shutter, douser, cam stop, crank handle and lamp house shield, showing the shutter and douser in open position; and Fig. 3 is a rear elevation of the shutter, douser and crank handle showing the shutter in closed position and the douser in either open or closed positions.

In describing the details of construction which have been adapted for the purpose of illustration, the assembly of a cinema apparatus utilizing my invention will first be considered.

In the present day cinema projection practice it is customary for the operator to test the intensity and homogeneousness of the projector beam prior to screen illumination and thus avoid inconveniencing the audience. To accomplish this the operator usually cuts off all but a portion of the projection beam which is allowed to pass through a pin hole in a shield and is projected on an intercepting diminutive screen which generally consists of a card held by the operator.

This method is not only found inconvenient but also inaccurate since the image which is produced by pin hole projection is very indistinct and as compared to one that is formed by a projection opening of material size and at a definite distance from said opening.

Referring to Fig. 1, numeral (1) designates the lamp house and (2) the projector. In connection with the lamp house is shown the incandescent lamp (3), reflector (4), condenser lenses (5) and (6), lens casing (7), lens casing supporting rods (8) and (9), supporting frame (10), slide frame (11), light shield (12), douser (13), shutter (14) and crank (15).

The lamp house (1) is connected to the projector (2) by means of the link (16). In connection with the projector is shown the projector housing (17) and frame door (18). Attached to the frame door (18) and projecting perpendicularly therefrom is the supporting rod (19), constituting a bracket to which is adjustably attached the auxiliary condenser frame (20), auxiliary condenser shield (21) and target (22) which are fully described in the aforementioned copending application.

The lamp house shutter and douser, which constitutes the patentable features of this invention, will now be described. The shutter (14) which is placed directly in front of the condenser lenses (5) and (6) consists in a half circular half rectangular shield, which is drilled centrally and at one corner of its rectangular portion, the latter circularly drilled opening (23) serving as a bearing by which the shutter is rotatably mounted on an axial support consisting of a shaft (24) which is rotatably mounted in a bearing (25) formed in the slide frame (11).

The centrally drilled opening (26) in the shutter (14) is for the projection of a central pencil ray which will be hereinafter further described. The undrilled corner of the rectangular portion of the shutter is cut off to form an abutting edge (28) which, when the shutter is lowered comes into contact with the upper portion of the supporting frame (10) which acts as a stop.

At one extremity of the shaft (24) is rigidly attached a douser (13) consisting of a comparatively narrow metallic strip having slightly diverging opposite edges and which is limited in its relative angular movement with respect to the shutter (14) by a narrow strip (29) formed between two parallel slits cut in the shutter. The strip is raised sufficiently beyond the surface of the shutter to permit the insertion of the douser thereunder, and sufficient clearance is allowed at either end of the raised strip (29) to permit a slight movement of the douser relative to the shutter, as shown by dotted lines in Fig. 3. This slight movement is required to uncover the central opening (26) after the shutter is closed as will hereinafter be described.

At one end of the crank (15) is attached a thumb wheel (30) and at the opposite end is formed a boss which is drilled to fit the shaft (24) to which it is rigidly attached. On the external surface of this boss is cut a cam (31) which reacts against the plunger (32) slidably mounted in the circularly drilled opening (33) in the lug (34) projecting from the upper portion of the slide frame (11). One end of the plunger (32) is rounded, the other flat, the flattened end serving as a bearing surface for contact with a coil spring (35) which is held within the circular opening (33) by means of the machine screw (36).

On the surface of the cam (31) is cut a groove (37) into which the rounded end of the plunger (32) moves when the cam is rotated until the groove (37) registers with the circularly drilled opening (33), thus retaining the douser (13) and shutter (14) in an elevated position as shown in Fig. 2.

The flattened surface (38) of the cam (31) is cut so that the distance from the axis of the shaft to points on its surface increase directly as the distance increases from the groove (37). Thus it will be seen that in lowering the douser the cam reacts against the action of the plunger (32) and since the shutter (14) is rotatably mounted on the shaft (24) it simply follows the douser until it reaches its lowermost position where the shutter is stopped by abutting the supporting frame (10). If the cam is then rotated farther the clearance between the width of the douser (13) and the ends of the strip (29) will permit the douser to move onward until the central opening (26) in the shutter (14) is uncovered.

In the operation of my device the shutter and douser which are retained in an upright position as shown in Fig. 2 are lowered to the position shown in Fig. 3, by turning the crank handle (15). In this latter position it is seen that the shutter abuts the supporting frame (10) and can therefore move no farther, but on further movement of the crank (15) the douser which is held in its upright position by the coaction between the cam (31) and the plunger (32) will be rotated until the control opening in the shutter is uncovered.

From the above description it is seen that the shutter and douser are operated by a single control means which shuts off the light at the lamp house from the rest of the apparatus and uncovers the opening (26) to permit the emergence of a restricted beam for auxiliary projection purposes as explained in my aforementioned copending application.

Although in the foregoing certain elements have been described as best adapted to perform the functions allotted them, nevertheless it is to be understood that various minor changes may be resorted to within the scope of the appended claims without departing from or sacrificing any of the principles of the invention.

Having described my invention, what I claim as new and wish to secure by Letters Patent is:

1. In a projection apparatus the combination with a radiant condenser and objective system, optically associated to produce a beam suitable for projection purposes; of a shutter operable into and out of the path of the beam and having a central opening therein, a douser normally closing said opening, said douser being rotatably mounted adjacent to and concentric with said shutter and adapted to momentarily expose said opening to produce a beam of restricted dimensions.

2. In a projection apparatus the combination with a radiant condenser and objective system, optically associated to produce a beam suitable for projection purposes; of a shutter mounted in front of the condenser system, rotatable into and out of the path of the beam and having a central opening therein, a douser normally closing the shutter opening, said douser being rotatably mounted adjacent to and concentric with said shutter and adapted to momentarily expose said opening to produce a beam of restricted dimensions.

3. In a projection apparatus the combination with a radiant condenser and objective system, optically associated to produce a beam suitable for projection purposes; of a shutter adapted to intercept the beam in front of the condenser system and having a central opening therein, a douser normally closing the shutter opening, said douser being rotatably mounted adjacent to and concentric with said shutter and adapted to momentarily expose said opening to produce a beam of restricted dimensions.

4. In a projection apparatus the combination with a radiant condenser and objective system, optically associated to produce a beam suitable for projection purposes; of a shutter having a central opening, revolvably mounted upon a rotatable shaft, a douser rigidly mounted on said shaft and adapted to normally close the shutter opening, and operable to expose said opening to produce a beam of restricted dimensions.

5. In a projection apparatus the combination with a radiant condenser and objective system, optically associated to produce a beam suitable for projection purposes; of a shutter having a central opening revolvably mounted upon a rotatable manually controlled shaft, a douser rigidly mounted on said shaft and adapted to normally close the shutter opening, and operable to expose said opening to produce a beam of restricted dimensions.

6. In a projection apparatus the combination with a radiant condenser and objective system, optically associated to produce a beam suitable for projection purposes; of a shutter having a central opening revolvably mounted upon a rotatable manually controlled shaft, means to govern the degree of rotation of said shaft, and a douser rigidly mounted thereon and adapted to normally close the shutter opening and operable to expose said opening to produce a beam of restricted dimensions.

7. An assembly for projection apparatus comprising in combination a shutter rotatable through a predetermined angle, a douser simultaneously operable with the shutter and normally closing a central opening therein, said douser being mounted for differential movement with respect to the shutter when the latter has attained the limit of its angular movement and means in connection with the douser to effect its restoration to normal position.

8. An assembly for projection apparatus comprising in combination a shutter, a douser overlying the shutter and normally closing a centrally arranged opening therein, said shutter and douser being concentrically mounted and simultaneously operable through a predetermined angle, means affording a differential movement between shutter and douser when the former has attained the limit of its angular movement and additional means in connection with the douser to effect its restoration to normal position.

9. An assembly for projection apparatus comprising in combination a supporting structure formed with an opening for the passage of a projection beam, a rotatable shutter having open and closed positions relative to said opening, a douser operable with the shutter and normally closing a centrally arranged opening therein, means in connection with the douser to effect its yieldable retention in normal position, and interacting means between shutter and douser permitting a limited movement of the latter after the former has attained its closed position.

10. An assembly for projection apparatus comprising in combination a supporting structure formed with an opening for the passage of a projection beam, a shutter rotatable into open and closed positions with respect to said openings, a douser operable with the shutter and normally overlying an opening centrally arranged in the shutter, spring pressed means in connection with the douser to yieldably effect its retention in normal position and interacting means between the shutter and douser permitting a limited movement of the latter after the former has attained its closed position.

11. An assembly for projection apparatus comprising in combination a supporting structure formed with an opening for the passage of a projection beam, a rotatable shutter having open and closed positions with respect to said opening, a douser operable with the shutter and normally overlying a centrally arranged opening in the shutter, means in connection with the douser to effect its yieldable retention in normal position and a strap connection between shutter and douser, the length of said connection being such as to permit a limited movement of the douser after the shutter has attained its closed position.

12. An assembly for projection apparatus comprising in combination a supporting structure formed with an opening for the passage of a projection beam, a shutter rotatable into open and closed positions with respect to said opening, a douser simultaneously operable with the shutter and normally closing a centrally arranged opening therein, a strap carried by the shutter and embracing the douser, the length of the strap being such as to permit a limited movement of the douser when the shutter has attained a closed position, and means in connection with the douser to effect its yieldable retention in normal position, said means including a rotatable shaft associated with the shutter and douser, cam surfaces formed on the shaft and a spring pressed plunger coacting with such surfaces.

13. An assembly for projection apparatus comprising in combination a supporting structure formed with an opening for the passage of a projection beam, a shaft rotatably mounted upon said structure, a shutter loosely carried by the shaft and adapted to be disposed in open and closed positions with respect to said opening, a douser keyed to said shaft and normally located in overlying relation with respect to an opening centrally arranged in the shutter, a strap carried by the shutter and embracing the douser, the length of said strap being such as to permit of a limited relative movement between douser and shutter, and means yieldably maintaining the douser in its normal position, said means including cam surfaces on said shaft, the location of said surfaces corresponding to open and closed positions of the shutter and a spring pressed plunger coacting with said surfaces.

ROGER M. HILL.